(12) United States Patent
Yankov et al.

(10) Patent No.: US 9,164,219 B2
(45) Date of Patent: Oct. 20, 2015

(54) FRONTLIGHT UNIT FOR REFLECTIVE DISPLAYS

(75) Inventors: Vladimir Yankov, Washington Township, NJ (US); Igor Ivonin, Yubileinyi (RU); Leonid Velikov, San Carlos, CA (US)

(73) Assignee: NANO-OPTIC DEVICES, LLC, Santa Clara, CA (US)

( * ) Notice: Subject to any disclaimer, the term of this patent is extended or adjusted under 35 U.S.C. 154(b) by 982 days.

(21) Appl. No.: 13/373,434

(22) Filed: Nov. 14, 2011

(65) Prior Publication Data
US 2013/0121019 A1    May 16, 2013

(51) Int. Cl.
*G02B 6/00* (2006.01)
*F21V 8/00* (2006.01)
*G02B 6/12* (2006.01)
*G02B 26/00* (2006.01)

(52) U.S. Cl.
CPC ............ *G02B 6/0035* (2013.01); *G02B 6/0001* (2013.01); *G02B 6/0028* (2013.01); *G02B 6/12007* (2013.01); *G02B 6/0078* (2013.01); *G02B 26/001* (2013.01); *G02B 2006/12097* (2013.01); *G02B 2006/12107* (2013.01)

(58) Field of Classification Search
CPC ............... G02B 6/0028; G02B 6/0035; G02B 2006/12097; G02B 2006/12107; G02B 6/0078; G02B 6/001; G02B 26/001
USPC .................. 362/603, 620, 626, 553, 554, 556
See application file for complete search history.

(56) References Cited

U.S. PATENT DOCUMENTS

| | | | |
|---|---|---|---|
| 6,104,454 A * | 8/2000 | Hiyama et al. | 349/65 |
| 6,650,382 B1 | 11/2003 | Sumida et al. | |
| 6,657,683 B2 | 12/2003 | Richard | |
| 7,253,853 B2 * | 8/2007 | Imamura et al. | 349/63 |
| 7,502,081 B2 | 3/2009 | Umemoto et al. | |
| 7,508,466 B2 | 3/2009 | Hutchins | |
| 7,603,001 B2 | 10/2009 | Wang et al. | |
| 7,733,439 B2 | 6/2010 | Sampsell et al. | |
| 7,777,954 B2 | 8/2010 | Gruhike et al. | |
| 7,813,026 B2 | 10/2010 | Sampbell | |
| 7,845,841 B2 | 12/2010 | Sampsell | |
| 7,855,827 B2 | 12/2010 | Xu et al. | |
| 7,859,610 B2 | 12/2010 | Mizushima | |
| 7,859,731 B2 | 12/2010 | Choi | |
| 7,864,395 B2 | 1/2011 | Chui | |
| 7,944,524 B2 | 5/2011 | Akiyama et al. | |
| 7,949,213 B2 | 5/2011 | Mienko et al. | |
| 8,009,244 B2 | 8/2011 | Totiyama et al. | |
| 2008/0259247 A1 | 10/2008 | Stuart et al. | |

(Continued)

*Primary Examiner* — Sharon Payne
(74) *Attorney, Agent, or Firm* — TransPacific Law Group; Pavel I. Pogodin, Esq.

(57) ABSTRACT

The frontlight unit is intended for enhancing illumination of a reflective display having pixels arranged in a matrix pattern and using monochromatic laser lights as light sources. The unit contains a network of light-distribution planar ridge waveguides with holograms arranged in a matrix pattern that corresponds to the matrix pattern of the reflective display when it is applied onto this display and emits light in the downward direction in the form of diverging beams that fall onto the pixels of the reflective display and in the upward direction onto mirrors wherefrom light is reflected also in the form of diverging beams onto the reflective display. Thus, all of the light reflected from the holograms of the light-distribution planar ridge waveguides is not lost and is used entirely for illumination of the reflective display. The mirrors occupy no more than 5% of the display surface area.

20 Claims, 6 Drawing Sheets

(56) References Cited

U.S. PATENT DOCUMENTS

| | | | |
|---|---|---|---|
| 2011/0026270 A1 | 2/2011 | Onishi | |
| 2011/0044070 A1* | 2/2011 | Takahashi | 362/553 |
| 2013/0100695 A1* | 4/2013 | Yankov et al. | 362/602 |

\* cited by examiner

FRONTLIGHT UNIT FOR REFLECTIVE DISPLAYS

FIELD OF THE INVENTION

The present invention relates to a frontlight unit for reflective displays and is aimed at improving brightness of illumination and efficiency of the light source energy consumption. The invention may find use in displays of mobile devices having poor illumination conditions such as laptop computers, cell phones, iPads or tablets, so-called electronic paper, electronic calculators, electronic labels, or the like.

BACKGROUND OF THE INVENTION

A frontlight unit is a means for illuminating a display assembly, such as a liquid crystal display (LCD), an interferometric modulation display, or a display that is viewed in ambient light. A provision of the frontlight unit improves performance of the display in poor lighting conditions. Frontlights are inferior to backlights and are usually used as an auxiliary feature.

Generally, a display presents an image by absorbing some of the light passing through. When an electrical field is applied across the crystal, e.g., in an LCD, the electrical field changes the passing light so that light does not pass through a polarization filter. When the electrical field is absent, the polarization filter passes predetermined wavelength components of white light. The remaining portion of white light is absorbed. For example, in an RGB image obtained from white light, approximately two-thirds of the light energy is lost and does not participate in the image-formation process. The aforementioned absorbed light is produced by a power source, e.g., a battery-operated device. If it were possible to obviate the losses of light energy associated with the absorption of the light components that do not participate in the image-formation process, it would be possible to significantly improve power-source efficiency, i.e., to prolong the service life of the light source, such as a battery.

A nonilluminated display may be lit from the front. To use ambient light in an LCD, the liquid crystal, itself, is sandwiched between a polarization filter and a reflective surface, i.e., a mirror. The mirror causes the display to be opaque so that the display cannot be illuminated from the back. In order to improve the brightness and contrast of the image reproduced by a reflective display, it is desirable to enhance illumination with an additional artificial source of frontlight.

Frontlight systems for reflective displays are relatively new devices, and the concept of frontlight display is also relatively new. Nevertheless, many patents and patent applications are already dedicated to the structure and use of frontlight devices (see, e.g. U.S. Pat. No. 6,650,382 issued on Nov. 18, 2003 to Sumida, et al; U.S. Pat. No. 6,657,683 issued on Dec. 2, 2003 to Richard; U.S. Pat. No. 7,603,001 issued on Oct. 13, 2009 to Wang, et al; U.S. Pat. No. 7,502,081 issued on Mar. 10, 2009 to Umemoto, et al; U.S. Pat. No. 7,733,439 issued on Jun. 8, 2010 to Sampsell, et al; U.S. Pat. No. 7,777,954 issued on Aug. 17, 2010 to Gruhike, et al; U.S. Pat. No. 7,855,827 issued on Dec. 21, 2010 to Xu, et al; U.S. Pat. No. 7,813,026 issued on Oct. 12, 2010 to Sampsell; U.S. Pat. No. 7,864,395 issued on Jan. 4, 2011 to Chui; U.S. Pat. No. 8,009,244 issued on Aug. 30, 2011 to Toriyama, et al; U.S. Pat. No. 7,944,524 issued on May 17, 2011 to Akiyama, et al; and U.S. Pat. No. 7,949,213 issued on May 24, 2011 to Mienko, et al).

Various methods for delivery of frontlight are known in the art. Most often, a light source is placed around the perimeter of an LCD. Other systems use backlight, which is redirected to the display edges and then propagates through the space between the display itself and the front protective layer. There exists a great variety of improvements to both of these concepts, such as preventing exit of propagated light from the aforementioned space, or similar methods aimed at providing full reflection of light in said space. Other methods and means are aimed at improving efficiency of frontlight-separation, e.g., improving input of light from display edges, etc.

Common drawbacks of existing frontlight display illumination systems are inefficient use of the light source, insufficient brightness and contrast, and complexity of the structure.

Implementation of the holographic technique for frontlight display illumination is also known in the art. U.S. Pat. No. 7,845,841 issued on Dec. 7, 2010 to J. Sampsell discloses a frontlight display illuminator that uses holograms embedded in a waveguide plate of a special configuration.

U.S. Pat. No. 7,859,731 issued on Dec. 28, 2010 to Jin-Seung Choi discloses an illumination apparatus and method for a display device designed such that light is incident on a hologram or hologram pattern at an angle for which diffraction efficiency is highest. The illumination apparatus includes at least one point of light source that emits light and a light guide plate (LGP) that has at least one point of light source disposed on a side thereof and a hologram pattern on a top surface that permits the light incident from the point of light source to exit from the top surface. The side of the LGP facing the point of light source is inclined such that the light is incident obliquely on the hologram pattern at an altitude angle that provides high diffraction efficiency.

The use of lasers for backlighting is known. For example, U.S. Pat. No. 7,508,466 issued on May 24, 2009 to Hutchins discloses an LCD display that includes a planar array of transmissive LCD devices and at least one laser diode device spaced apart from the planar array of LCD devices. At least one laser diode device is configured to illuminate at least a subset of the LCD devices of the planar array of LCD devices so that in operation the laser diode device provides backlighting for the subset of LCD devices.

US Patent Application Publication No. 20110026270 published on Feb. 3, 2011 to Onishi discloses a surface light-source device from which a large planar light with uniform light intensity distribution can be obtained from a spot-like laser light. The surface light-source device comprises a laser light source for emitting the laser light, an optical system including one or more reflective diffusion members, and an optical waveguide combined with the optical system for converting reflected and diffused laser light into the planar light and emitting from a principal plane. The reflective diffusion member converts the laser light emitted from the laser light source into linear light having an arcuate radiation pattern.

US Patent Application Publication No. 20080259247 (published on Oct. 23, 2008, inventor: C. Stuart, et al) discloses a display, such as an LCD panel, that is illuminated using frequency-doubled vertical extended-cavity surface-emitting lasers (VECSELs) as efficient light sources. Visible light from the VECSELs are directed to an illuminating panel using optical fibers and/or optical gratings to provide substantially uniform illumination of the illuminating panel. Visible light from the illuminating panel, which can be provided at a particular number of primary wavelengths by the VECSELs, is then used to illuminate the display.

A laser light source supplied by special optics for use in planar lighting devices as a backlight lighting device is also known in the art. U.S. Pat. No. 7,859,610 granted on Dec. 28, 2010 to T. Mizushima describes a laser system that can be used for RGB laser light illumination in display assemblies.

SUMMARY

The present invention relates to frontlight units for reflective displays having pixels arranged in a matrix pattern and is aimed at improving image quality, i.e., brightness and contrast reproduced in reflective displays. Such displays are used, e.g., in electronic calculators, electronic labels, so-called electronic paper, or the like, and are also aimed at improving efficiency of light-source energy consumption.

The frontlight illumination system of the invention for a reflective display has a layered structure that comprises a rectangular transparent substrate, the surface of which is covered with a net of planar ridge waveguides. This net is used for delivering specific monochromatic laser lights, e.g., red, green, and blue colors to specific points on the substrate.

Structurally, each planar ridge waveguide of the net comprises a core embedded into a cladding layer. The core and cladding are made from transparent optical materials that have different coefficients of refraction. Both can be made from the same materials, but these materials should have different coefficients of refraction. For example, these materials can be a pair of silicon oxides $SiO_2$ or a pair of silicon nitrides $Si_3N_4$, etc. If necessary, the upper cladding may be coated with a transparent protective film.

The system also contains laser light sources, e.g., red, green, and blue lasers that deliver lights to the aforementioned net through a light-separating planar ridge waveguide that is located on one side of the rectangular substrate. Furthermore, the system contains a plurality of light-distribution planar ridge waveguides. These light-distribution planar ridge waveguides are combined into a set of waveguides for guiding lights of different colors that are arranged in parallel to each other. A plurality of such sets extends across the substrate perpendicular to the light-separating planar ridge waveguide to which the plurality of sets is optically coupled. For RGB lights, each set may comprise a triplet that consists of parallel planar ridge waveguides for propagating red, green, and blue lights.

The core surface of each light-separating planar ridge waveguide contains a pattern of first individual lightbeam redirection means in the form of digital planar holograms that redirect the light of different wavelengths obtained from specific lasers into the corresponding light-distribution planar ridge waveguides. The latter, in turn, have on the surfaces of their cores a pattern of digital planar holograms that redirect a part of the light outward in both directions from the plane of the transparent substrate.

In order to efficiently use outwardly emitted light in both directions from the light-distribution planar ridge waveguides by holograms, the system is provided with second lightbeam redirection means in the form of mirrors formed on the external surface of the cladding in order to redirect the light incident onto these mirrors back toward the transparent substrate. These mirrors are so small that they can be considered as micromirrors, which will be further referred to merely as mirrors. The thickness of the portion of the cladding between the external surface of the cladding and the core, and hence the vertical position of the mirrors, is selected so that the light emitted from the holograms and the light reflected from the mirrors toward the substrate will propagate with a phase shift that provides positive interference. In order not to block a major portion of the light directed outward from the system toward a viewer, the total surface area occupied by the mirrors should not exceed 10% of the entire external surface of the cladding.

Although the system of the invention applies to reflective displays of many types, including monochromatic displays, the invention illustrated herein applies to the most advanced display devices, such as interferometric modulation displays (IMODs). An IMOD comprises a microelectromechanical system (MEMS) device that is composed of two conductive plates. One of these plates is a thin-film stack on a glass substrate, and the other is a reflective deformable membrane suspended under the substrate. A gap between both plates is filled with air. The IMOD element has two stable states. The plate and membrane are separated when no voltage is applied, and the light that is incident onto the plate and membrane is reflected. When voltage is applied, the membrane deforms and moves toward the plate. As a result, light is absorbed, and the element turns black. The conventional IMOD element described above comprises a Fabry-Perot microresonator, or cavity.

In this cavity, a thin-film mirror is fabricated on a transparent substrate, leaving an air gap of a few hundred nanometers between the thin-film mirror and the substrate. When ambient light enters the aforementioned cavity and reflects off the thin-film mirror, the light interferes with itself, producing a resonant color, which has been extracted from the ambient white light. This resonant color, e.g., red, green, or blue, is determined by the height of the cavity. One separate IMOD element is a one-bit device, that is, it can be driven to either a dark (black or OFF) or bright (color or ON) state. In order to show gray scale images, spatial or temporal dithering is used. The term dithering means the "smoothening" of sharp boundaries between two colors, i.e., the formation of gray scaling in the field of a certain color.

The previously described IMOD elements are brought into contact with the lower surface of the transparent substrate of the reflective display so that they form pixels arranged in a matrix pattern, where each pixel comprises subpixels that generate predetermined colors. For example, with regard to RGB, a subpixel may contain one subpixel element of each color, e.g., a red subpixel, a green subpixel, and a blue subpixel, or two subpixel elements of each color, or four subpixel elements of each color, etc. The subpixels are grouped into sets of three colors, which hereinafter are referred to as triplets. The triplets, in turn, are grouped into rectangular configurations. In fact, these configurations form a regular matrix of pixels that correspond to the matrix of pixels on the reflective display. Thus, spatial dithering divides the given subpixels into many smaller, individually addressable subpixel elements and makes it possible to drive these elements separately in order to obtain gray levels. For example, if the system described above is designed for reproducing 512 colors, the aforementioned spatial dithering scheme can generally produce eight gray shades per color.

In addition to spatial dithering, use of temporal dithering may significantly broaden the scope of color gradation and produce additional gray shades. Temporal dithering works by splitting each field of data into, for example, two fields, where one subfield continues four times longer than the other subfields. Cycling the frames at more than 50 Hz allows the eye of the viewer to time integrate the subfields and perceive the large number of gray shades.

The matrix system described above is known in the art and finds use in reflective displays operating with front ambient-light illumination. Attempts have been made to enhance the ambient-light illumination (see, e.g., US Patent Application Publication No. 20110199350 published on Aug. 18, 2011;

inventor: Kelce Steven Wilson), which, in fact, produces a positive effect. However, the quality of image reproduced by a reflective display may be further improved if the aforementioned matrix system is combined with the frontlight illumination system of the invention, which is intended for use with reflective displays and contains a planar ridge waveguide net. Although the frontlight illumination system of the invention is considered in combination with matrix IMOD elements for a reflective display, such a combination also applies to reflective displays of other types, e.g., electrophoretic reflective displays, LCD displays, or the like.

The front illumination system of the invention differs from systems of these aforementioned types by using monochromatic laser lights as light sources and by preventing substantially any loss of white light components delivered to the system. When the front illumination system of the invention is used as an auxiliary component to ambient light, the color-generation function of the IMOD elements may lose its prevailing role, while the function of changing reflected-light pixel intensity becomes dominant.

According to another aspect of the invention, the reflective-display frontlight illumination system of the above-described type may have holograms that are further provided with light-focusing features so that the focus points of the lightbeams can be located above and below the holograms in the upper and lower parts of the cladding, respectively, i.e., above or below the core. Actual positions of such focus points are determined by hologram pattern topology. This makes it possible to form converging and/or diverging lightbeams, and this property, in turn, can be used to provide uniformity of illumination. Another advantage of such a feature is that an individual hologram may illuminate more than one IMOD subpixel element.

BRIEF DESCRIPTION OF THE INVENTION

DETAILED DESCRIPTION OF THE INVENTION

The present invention relates to a frontlight illumination system for reflective displays having pixels arranged in a matrix pattern and is aimed at improving image quality, i.e., brightness and contrast of images reproduced in such displays when the latter are used in ambient light. Displays of this type are employed, e.g., in electronic calculators, electronic labels, so-called electronic paper, etc., and are also aimed at decreasing energy consumption of the light source.

Figure 1:
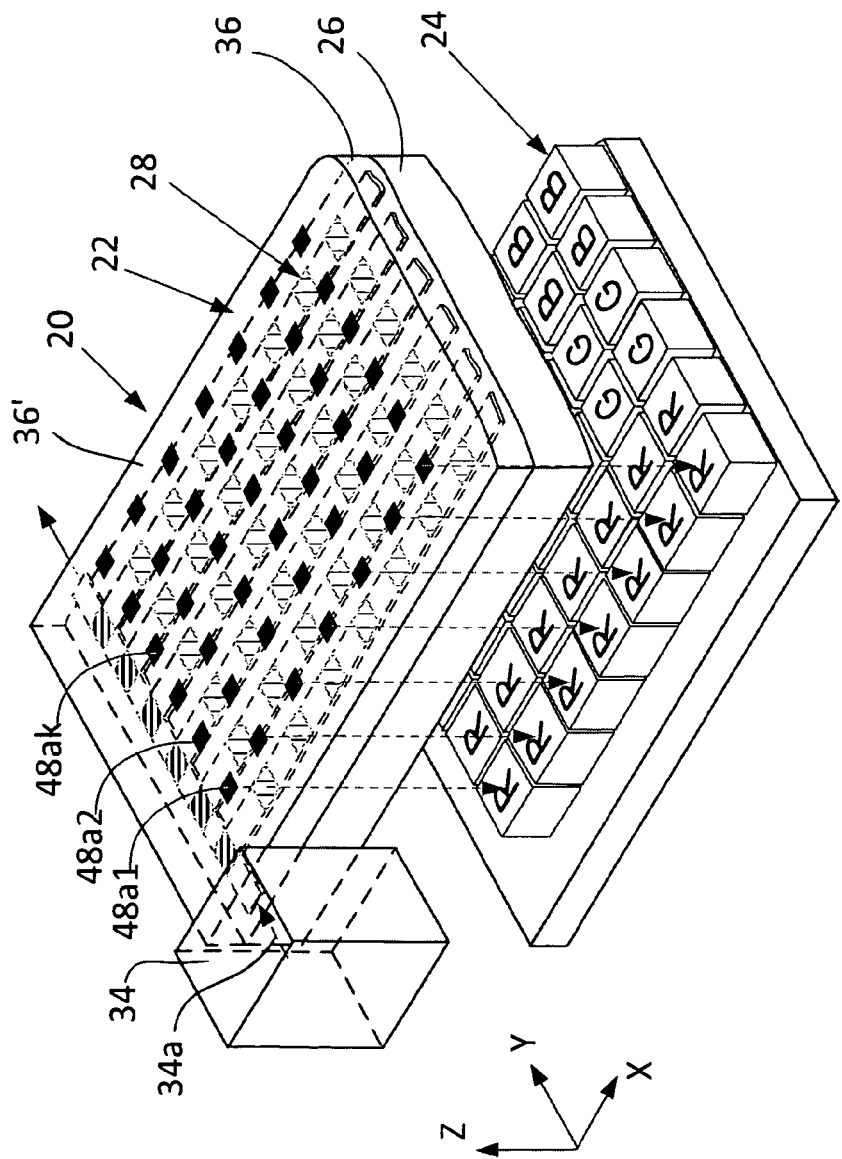
FIG. 1 is a simplified three-dimensional exploded view of the frontlight illumination system for a reflective display in accordance with one aspect of the invention.
Figure 2:
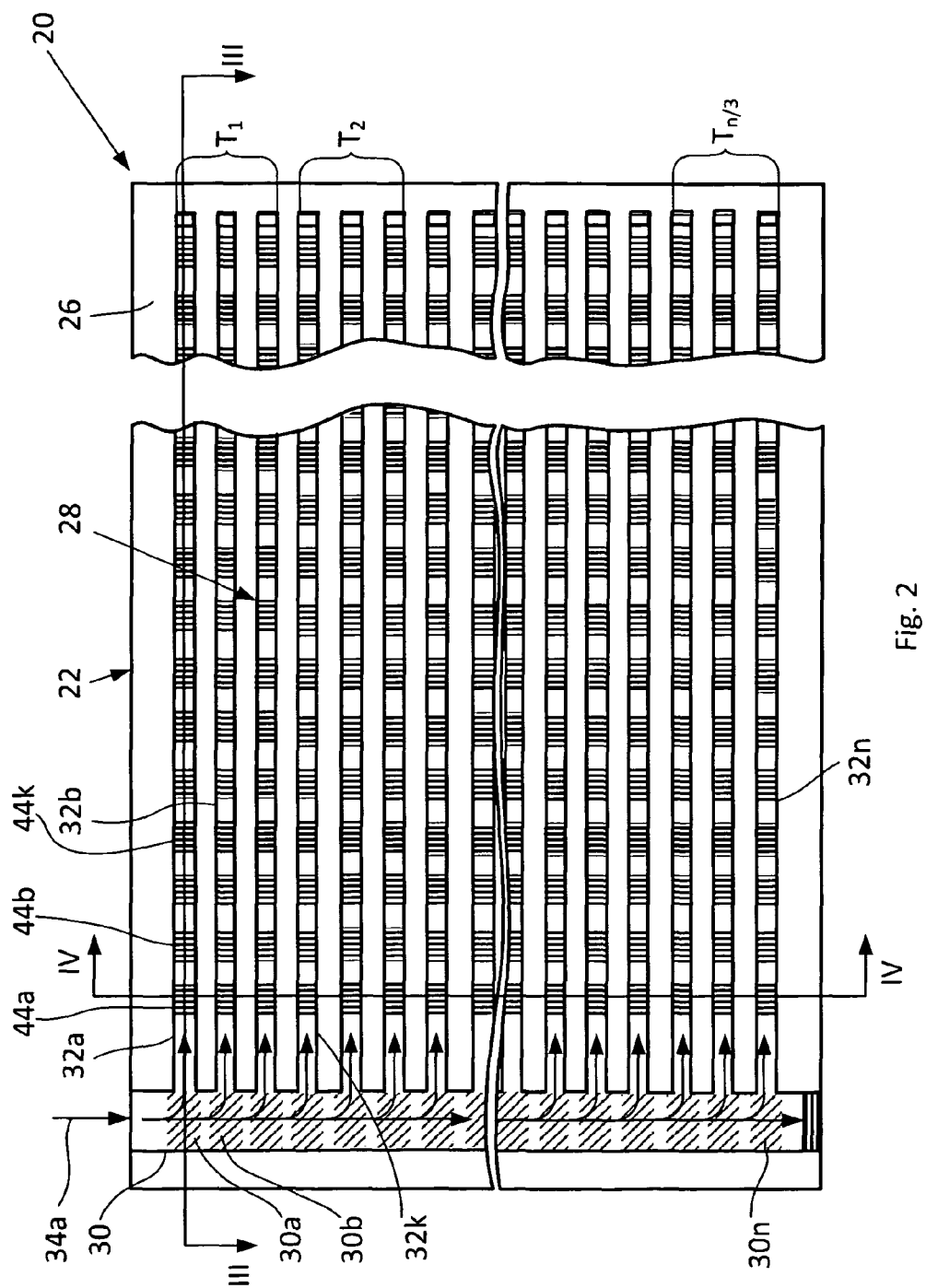
FIG. 2 is a top view of a planar ridge waveguide net with mirrors used in the frontlight illumination system of the invention.
Figure 3:
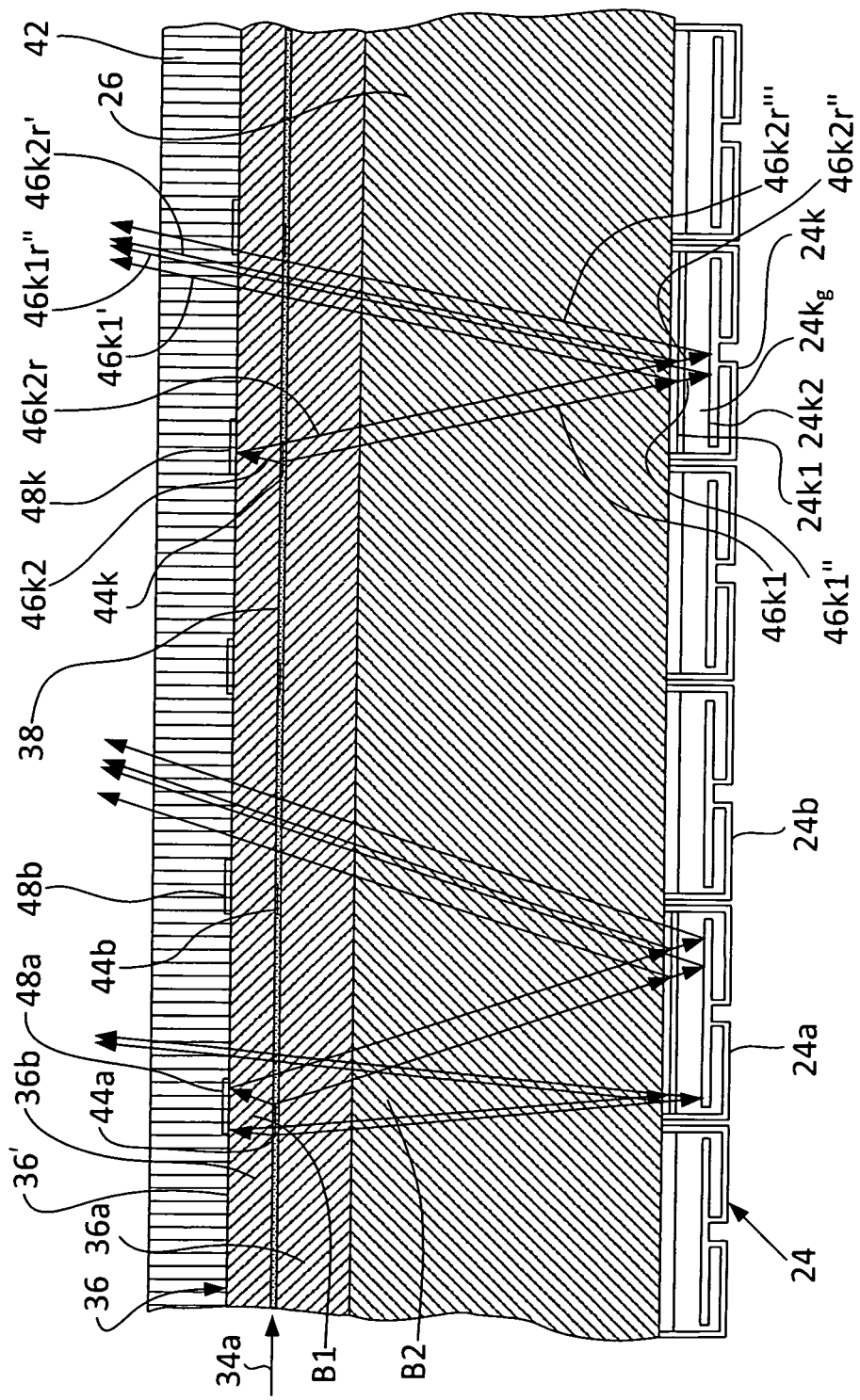
FIG. 3 is a sectional view along the line III-III in FIG. 2.

The invention will now be described in detail with reference to the accompanying drawings, where FIG. 1 is a simplified three-dimensional exploded view of the frontlight illumination system for a reflective display in accordance with one aspect of the invention, FIG. 2 is a top view of a planar ridge waveguide net with mirrors used in the frontlight illumination system of the invention, and FIG. 3 is a sectional view along the line III-III in FIG. 2.

As shown in FIG. 1, a frontlight reflective display system of the invention (hereinafter referred to as the "system"), which as a whole is designated by reference numeral 20, has a layered structure that comprises a frontlight illumination unit 22 that is shown in cooperation, e.g., with a matrix 24 of IMOD elements 24$a$, 24$b$, . . . 24$k$ (FIG. 3). It should be noted that the matrix of IMOD elements is beyond the scope of the present invention and is shown only as an example. The frontlight illumination unit 22 of the invention may operate in conjunction with other image-generation units such as electrophoretic reflective displays, etc.

The frontlight illumination unit 22 has a rectangular transparent substrate 26, the surface of which is covered with a net 28 of planar ridge waveguides. The net 28 is used for delivering specific monochromatic laser lights, e.g., red, green, and blue colors, to specific points on the substrate 26. The laser lights are shown by the arrow 34$a$ in FIG. 2.

The net consists of one light-separating planar ridge waveguide 30 that extends along one side of the rectangular transparent substrate 26 and a plurality of light-distribution planar ridge waveguides 32$a$, 32$b$, . . . 32$n$ that are optically coupled with predetermined points of the light-separating planar ridge waveguide 30, which is described in more detail later. The light-separating planar ridge waveguide 30 and the distribution planar ridge waveguides 32$a$, 32$b$, . . . 32$n$ have a common structure in their cross-sections, which are shown in FIG. 3. However, the light-separating planar ridge waveguide 30 and the distribution planar ridge waveguides 32$a$, 32$b$, . . . 32$n$ may vary in width. The core of the light-separating ridge waveguide 30 and the cores of all light-distribution planar ridge waveguides 32$a$, 32$b$, . . . 32$n$ that form the net 28 are embedded into a common cladding layer 36 (FIGS. 1, 2, and 3). If necessary, the external surface 36' of the cladding 36 may be coated with a transparent protective film 42.

Figure 7:
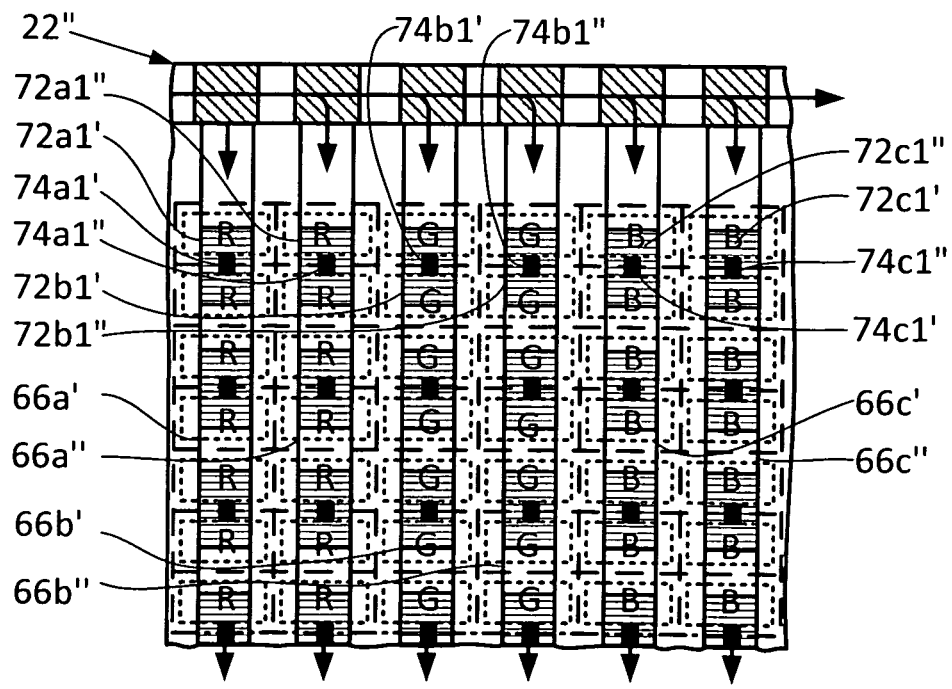
FIG. 7 is the same view as that shown in FIG. 6 but with a greater number of holograms and mirrors to illuminate pixels of the reflective display.

The light-distribution planar ridge waveguides 32$a$, 32$b$, . . . 32$n$ are combined into parallel sets of waveguides to guide lights of different colors. A plurality of such parallel sets extends across the substrate perpendicular to the light-separating planar ridge waveguide 30 to which the parallel sets are optically coupled, as mentioned above. With regard to RGB lights, each set may comprise a triplet that consists of parallel light-distribution planar ridge waveguides in order to propagate red, green, and blue lights. In FIG. 2 such triplets are designated by symbols $T_1, T_2, \ldots T_{(n/3)}$. It is understood that sets of parallel light-distribution planar ridge waveguides may contain more than three waveguides and may comprise, e.g., six waveguides composed of three pairs of waveguides operating with the light of the same wavelength in each pair. This is shown in FIG. 7, which is described later. Alternatively, each set may contain four waveguides to operate with the lights of four different wavelengths, e.g., red, green, blue, and yellow.

The core of the light-separating planar ridge waveguide 30 contains a pattern of first lightbeam redirection means in the form of digital planar holograms 30$a$, 30$b$, . . . 30$n$ (FIG. 2). These holograms redirect the lights 34$a$ (FIG. 2) of different wavelengths obtained from the specific lasers 34 into the corresponding specific light-distribution planar ridge waveguides 32$a$, 32$b$, . . . 32$n$.

The latter, in turn, have on their cores 38 (FIG. 3) a pattern of digital planar holograms 44$a$, 44$b$, . . . 44$k$ that redirect a part of the light outward in both directions from the plane of the transparent substrate 26. This is shown by arrows 46k1 and 46k2 in FIG. 3.

In order to efficiently use the outwardly emitted light in both directions from the light-distribution planar ridge waveguides 32a, 32b, . . . 32n (FIG. 2) by digital planar holograms 44a, 44b, . . . 44k, . . . and to redirect the light back toward the transparent substrate 26, the system 20 is provided with second lightbeam redirection means in the form of mirrors 48a1, 48a2, . . . 48ak, . . . (FIG. 1) formed on the external surface 36' of the cladding 36.

These mirrors are very small and may be considered as micromirrors. The thickness of the portion of the cladding 36 between the core 38 (FIG. 3) and the external surface 36' of the cladding, and, hence, the vertical position of the mirrors 48a, 48b, . . . 48k, . . . is selected so that the light emitted from the holograms 44a, 44b, . . . 44k and the light reflected from the mirrors 48a, 48b, . . . 48k, . . . toward the substrate 26 will propagate with a phase shift that may provide positive interference. In order not to block a major portion of the light directed outward from the system 20 toward the viewer (not shown), the total surface area occupied by the mirrors 48a, 48b, . . . 48k, . . . should not exceed 10% of the entire external surface of the cladding 36.

The system operates as follows.

The laser lights 34a (FIG. 2) generated by corresponding semiconductor lasers 34 (e.g., by red, green, and blue lasers 34) enter the light-separating planar ridge waveguide 30 where by means of the holograms 30a, 30b, . . . 30n, the red, green, and blue light components of the laser lights 34a are reoriented within the plane of the ridge waveguides in the direction perpendicular to the light-separating planar ridge waveguide 30 and enter the respective triplets $T_1, T_2, \ldots T_{(n/3)}$ (FIG. 2) of the distribution planar ridge waveguides operating with the red, green, and blue laser lights, respectively.

Further, light propagates through the light-distribution planar ridge waveguides 32a, 32b, . . . 32n (FIG. 2) and interacts with the holograms 44a, 44b, . . . 44k . . . (FIG. 3). The holograms 44a, 44b, . . . 44k, . . . also reorient the light in both upward and downward directions, which is shown by the lightbeams designated by arrows 46k1, 46k2 (FIG. 3).

As mentioned above and as shown in FIG. 3, the frontlight unit 22 of the invention is illustrated herein in cooperation with the matrix 24 of IMOD elements 24a, 24b, . . . 24k, . . . . It is assumed that at the moment shown in FIG. 3 the elements 24a, 24b, . . . 24k of IMOD matrix 24 are in their ON state.

In fact, each beam has a certain solid angle, and the ray tracing of an actual beam is shown on the left side of FIG. 3. In a simplified form as simple arrowed lines, the ray tracing is shown on the right side of FIG. 3. The hologram 44k emits a part of the light in the downward direction, as shown by arrowed line 46k1, and this beam passes through the lower part 36a of the cladding 36, the transparent substrate 26, and the partially transparent mirror 24 k1 of the IMOD matrix element 24k. Further, this beam 46k1 is partially reflected upward from the partially transparent mirror 24k1 as the beam 46k1' passes through the transparent substrate 26, the lower part 36a of the cladding 36, the core 38, and the upper part of the cladding 36b. It should be noted herein that the holograms 44a, 44b, . . . 44k, . . . , themselves, are transparent for any beams. The other part 46k1" of the downwardly directed beam 46k1 passes through the partially transparent mirror 24k1, falls onto the bistable and moveable nontransparent mirror 24k2, which at this moment is spaced from the partially transparent mirror 24k1 with a gap 24k$_g$, is reflected therefrom in the upward direction as a beam 46k1r", and similar to the first part 46k1' of the beam 46k1, passes through the partially transparent mirror 24k1, the transparent substrate 26, the lower part 36a of the cladding 36, the core 38, and the upper part 36b of the cladding 36. The gap 24k$_g$ between the mirrors 24k1 and 24k2 is of such dimension so as to provide positive interference of both parts of the same beam 46k1. The parts 46k1' and 46k1r" of the beam 46k1 that were reflected from the upper partially transparent mirror 26k1 and from the bistable and moveable nontransparent mirror 26k2 positively interfere with each other.

Meanwhile, the light that emitted from the hologram 44k in the upward direction as the beam 46k2 passes through the upper part 36b of the cladding 36 and is reflected downward (as shown by the arrowed line 46k2r in FIG. 3) by the mirror 48k located on the external side 36' of the cladding 36. The beam 46k2 passes through the upper part 36b of the cladding 36, the core 38, the lower part 36a of the cladding 36, the transparent substrate 26, and the partially transparent mirror 24k1 of the now-open IMOD matrix element 24k and is then turned into the beam 46k2r".

The other part 46k2r' of the beam 46k2r is reflected upward from the partially transparent mirror 24k1, passes through the transparent substrate 26, the lower part 36a of the cladding 36, the core 38, and the upper part 36b of the cladding 36. The part 46k2r" of the downwardly directed beam 46k2r passes through the partially transparent mirror 24k1, falls onto the bistable and moveable nontransparent mirror 24k2, which at this moment is spaced from the partially transparent mirror 24k1, is reflected therefrom as a beam 46k2r''' in the upward direction and passes through the transparent substrate 26, the lower part of the cladding 36a, the core 38, and the upper part 36b of the cladding 36. The gap 24k$_g$ between the mirrors 24k1 and 24k2 is of such dimension so as to provide positive interference of both parts of the same beam, meaning that beams 46k1', 46k1r", 46k2r', and 46k2r" must have equal phases. These conditions can be reached by selecting the thickness of the upper part of the cladding 36b.

When the IMOD element 24k is OFF, i.e., when the gap 24k$_g$ is absent, the respective beams have negative interference, and the light does not pass through the IMOD.

As mentioned above, on the right side of FIG. 3 the ray tracing is shown in simplified form. However, strictly speaking, the process involves multiple passes and reflections of beams between the partially transparent and moveable nontransparent mirrors as it takes place in the Fabry-Perot cavity, which in that case is formed between the mirrors of the IMOD matrix element. The simplified ray tracing shown in FIG. 3 facilitates understanding of the operating principle of the frontlight illumination system 22 of the invention in conjunction with a reflective display, such as the display 24 (FIG. 1).

Figure 4:
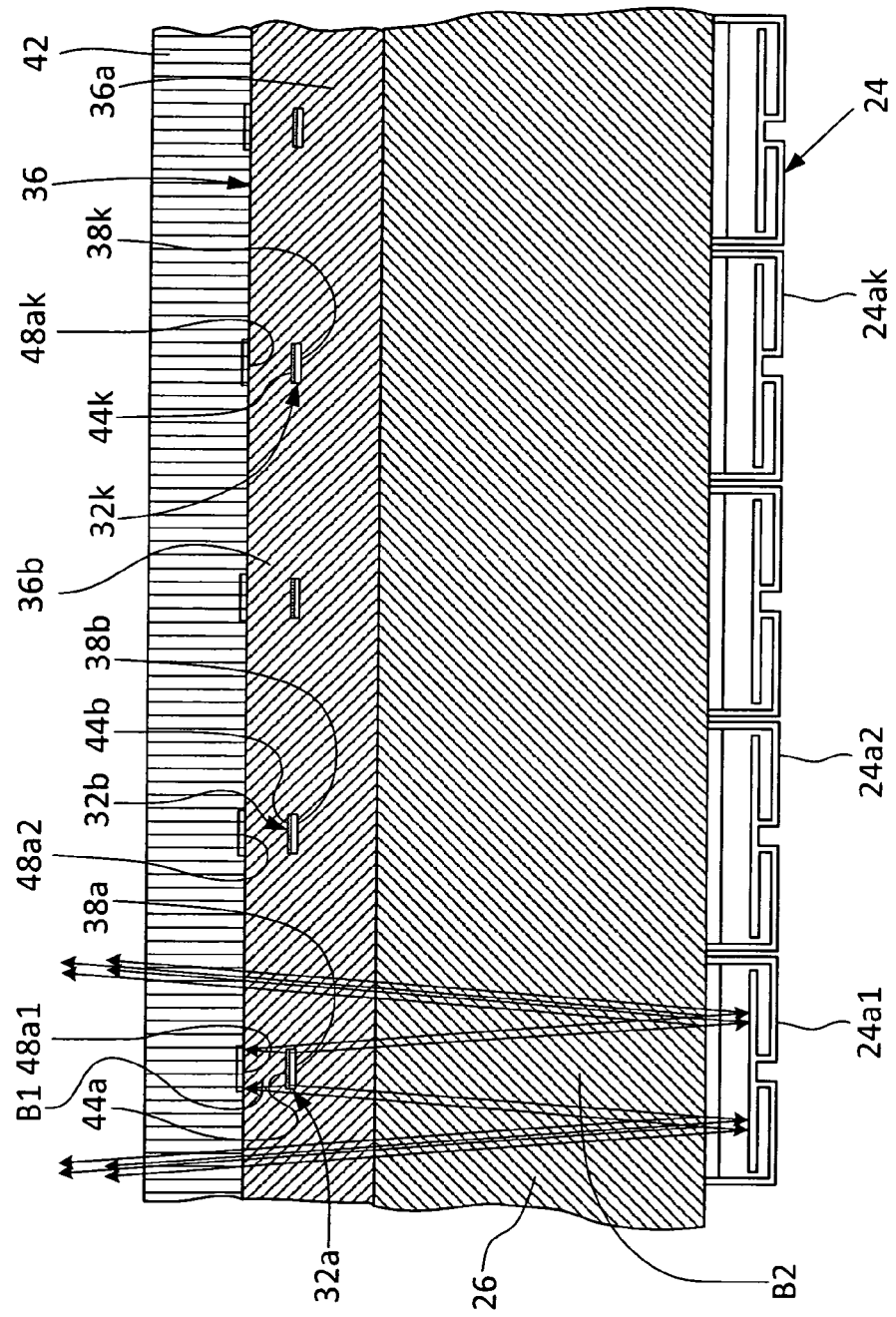
FIG. 4 is a sectional view along the line IV-IV in FIG. 2.

FIG. 4 is a sectional view along the line IV-IV in FIG. 2. It can be seen from this drawing that the cores 38a, 38b, . . . 38k, . . . of the respective light-distribution planar ridge waveguides 32a, 32b, . . . 32k, . . . comprise parallel strips that constitute together with the cladding 36 a part of the net 28 of the planar ridge waveguides. FIG. 4 also shows that the holograms 44a, 44b, . . . 44k, . . . formed on the surfaces of the cores 38a, 38b, . . . 38k, . . . have a beam-diverging property in the Y-Z plane (see FIG. 1), whereby beams emitted from holograms and returned from the IMOD elements may cover substantially the entire surface of the frontlight illumination unit observed by the user. It should be noted herein that the aforementioned divergence can be adjusted by selecting the appropriate topology of the hologram pattern and that the divergence can be matched with the aperture of the image-formation elements. In the illustrated examples these are IMOD elements 24a, 24b, . . . 24k, . . . (see FIG. 4). For the beams B1 and B2 that are emitted outward from the hologram 44*a*, divergence of the aforementioned beams should be selected so that the beams incident to the external surface 24' of the IMOD elements completely cover the portion of the surface 24' for which these beams are assigned (see FIGS. 6 and 7). Furthermore, the pattern of the hologram, e.g., the hologram 44*a*, can be designed so that overlapping of the beams B1 and B2 on the surface 24' is excluded. FIGS. 3 and 4 show the beams B1 and B2 in two mutually perpendicular cross sections, i.e., in planes Z-Y and Z-X, respectively.

Since the mirrors 48*a*, 48*b*, . . . 48*k*, . . . occupy a part of the cladding surface 36', they block a part of the "useful" light that otherwise could be used for creating an image on the reflective display. However, in spite of the presence of such mirrors, image quality is not affected because the total surface area of the mirrors does not exceed 5 to 10% of the display surface.

Figure 5:
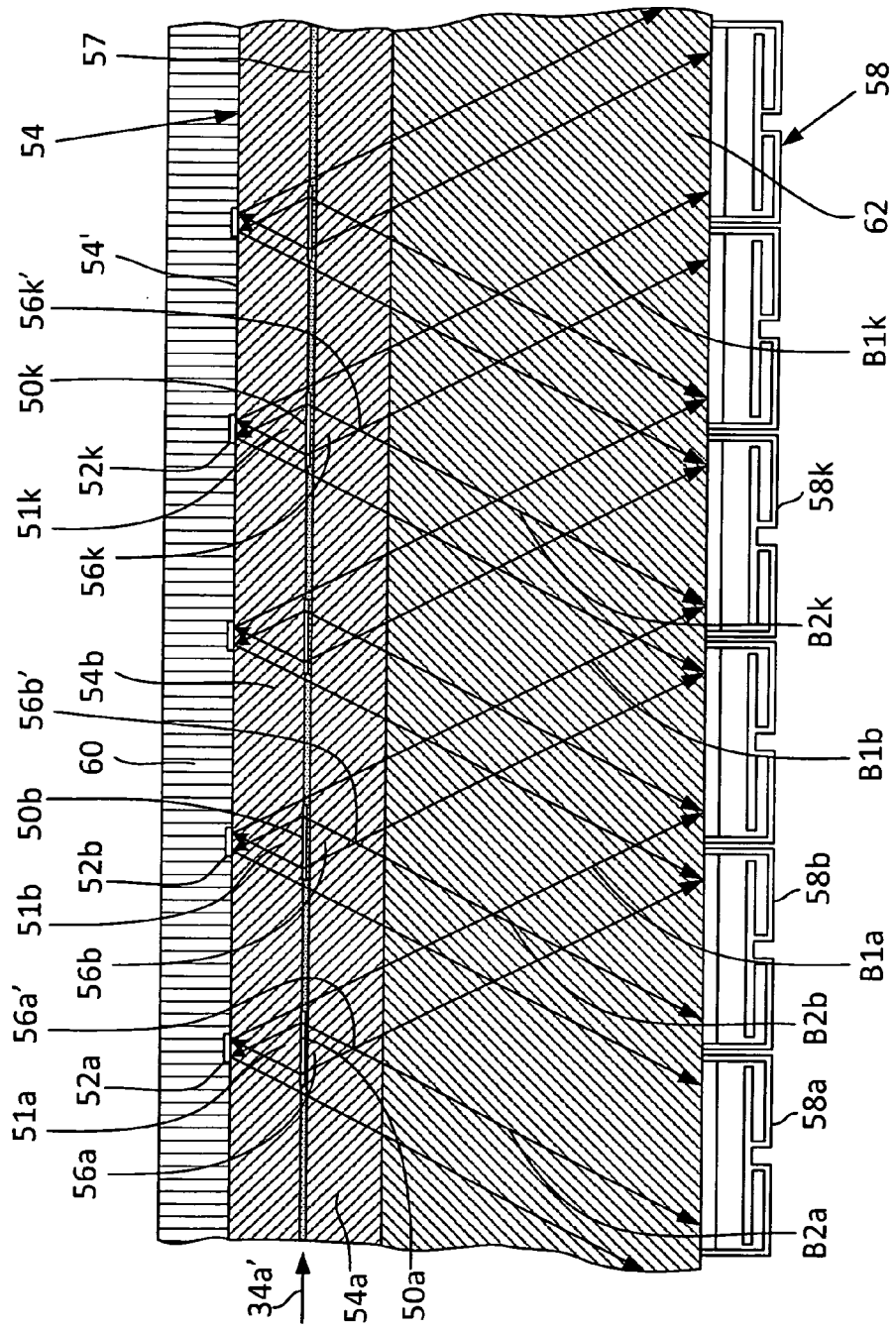
FIG. 5 is a schematic cross-sectional view of the frontlight illumination unit of the invention in conjunction with the matrix of IMOD elements.

According to another aspect of the invention, the effect of the mirrors 48*a*, 48*b*, . . . 48*k*, . . . on the external surface 36' of the cladding 36 can be further reduced, as shown in FIG. 5.

FIG. 5 is a schematic cross-sectional view of the frontlight illumination unit 22 in conjunction, e.g., with the matrix 24 of IMOD elements 58*a*, 58*b*, . . . 58*k*, . . . . As shown in FIG. 5, the holograms 50*a*, 50*b*, . . . 50*k*, . . . transform the laser light 34*a*', which passes through these holograms, into a plurality of converging beams 51*a*, 51*b*, . . . 51*k*, . . . that are focused in front of the respective mirrors 52*a*, 52*b*, . . . 52*k*, . . . located on the external surface 54' of the cladding 54. These beams fall from the focal points onto the respective mirrors 52*a*, 52*b*, . . . 52*k*, . . . in the form of small diverging beams, which, when incident to the aforementioned mirrors, do not exceed the boundaries of these mirrors. The lightbeams 51*a*, 51*b*, . . . 51*k* . . . are reflected from the mirrors 52*a*, 52*b*, . . . 52*k*, . . . —also in diverging form—and pass through the upper part 54*b* of the cladding 54, the core 57, the lower part 54*a* of the cladding 54, and the substrate 62, and they then fall in the form of beams B1*a*, B1*b*, . . . B1*k* . . . onto the IMOD elements 58*a*, 58*b*, . . . 58*k*, . . . wherefrom light is reflected in the image-carrying form toward the viewer (not shown). As a result, the viewer will see a colored image.

By arranging the focusing points of the beams upward from the holograms just in front of mirrors 52*a*, 52*b*, . . . 52*k*, . . . and in close proximity to these mirrors, it becomes possible to reduce the area occupied by the mirrors to less than 5% of the surface area of the frontlight unit 22 of the invention.

Similarly, the converging beams 56*a*, 56*b*, . . . 56*k*, . . . , which are emitted from the holograms 50*a*, 50*b*, 50*k* . . . in the downward direction, are focused on the focal points 56*a*', 56*b*', . . . 56*k*', they then pass as diverging beams B2*a*, B2*b*, . . . B2*k* . . . through lower part 54*a* of the cladding 54 and the transparent substrate 62, and they then fall onto more than one IMOD element wherefrom light is reflected to the viewer who sees a color image.

The beam interference phenomenon is the same as that described with respect to the first modification of the system 20 shown in FIGS. 1 through 4.

Hologram patterns are beyond the scope of the present invention and are subjects of other patent applications.

Figure 6:
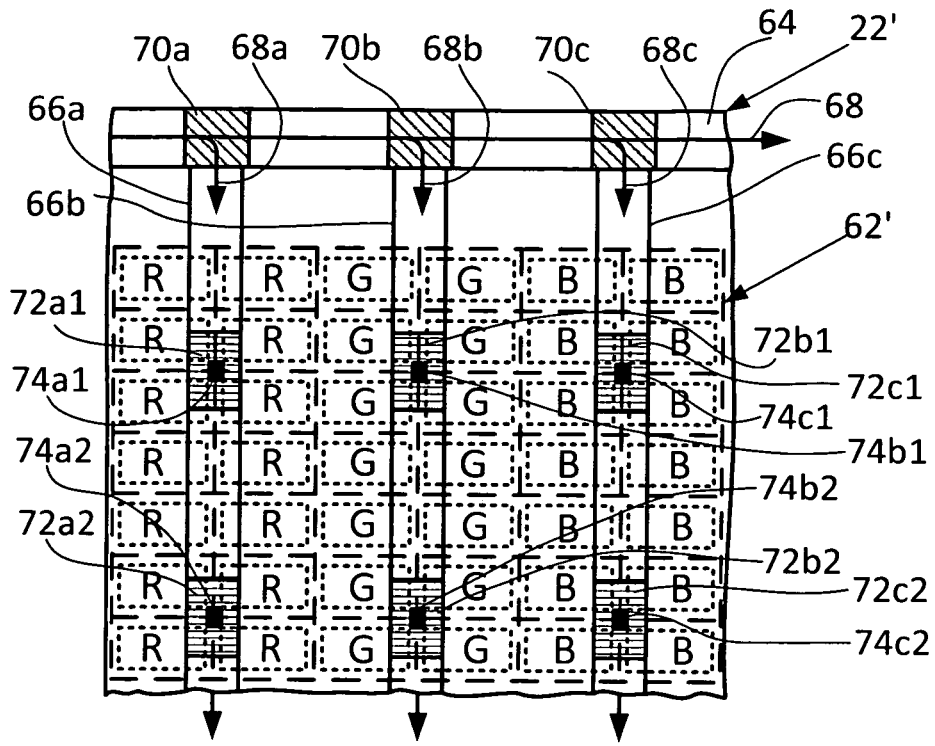
FIG. 6 is a top view of a portion of the frontlight unit (which is similar to the frontlight shown in FIG. 1) shown in cooperation with one pixel of an exemplary reflective display.

FIG. 6 is a top view of a part of the frontlight unit 22' (which is similar to the frontlight 22 shown in FIG. 1), which is shown in cooperation with an exemplary reflective display. Since this display is beyond the scope of the invention and is shown only as an example, it is depicted by broken lines. The part of the display shown in FIG. 6 corresponds to one pixel 62' of the display. For the sake of example only, the pixel 62' contains two rows of red subpixel elements (designated by the letter R), two rows of green subpixel elements (designated by the letter G), and two rows of blue subpixel elements (designated by the letter B). Similar to the frontlight unit 22 in FIG. 1, the frontlight unit 22' of this modification is overlaid onto the top of the reflective display shown in FIG. 6 so that each hologram interacts with eight subpixels of two adjacent rows of the same color. In this drawing, reference numeral 64 designates the light-separating planar ridge waveguide, reference numerals 66*a*, 66*b*, and 66*c* designate light-distribution planar ridge waveguide, reference numeral 68 designates the laser RGB lights that propagate through the light-separating planar ridge waveguide 64, and reference numerals 68*a*, 68*b*, and 68*c* designate monochromatic laser lights of red, green, and blue colors, respectively. The hatched areas correspond to the holograms 70*a*, 70*b*, and 70*c* of the light-separating planar ridge waveguide 64, and the hatched areas 72*a*1, 72*b*1, 72*c*1, 72*a*2, 72*b*2 and 72*c*2 correspond to the holograms of the light-distribution planar ridge waveguide 66*a*, 66*b*, and 66*c*. The small black squares 74*a*1, 74*b*1, 74*c*1, 74*a*2, 74*b*2 and 74*c*2 show reflective mirrors of the same type as the mirrors 48*a*, 48*b*, . . . 48*k* shown in FIG. 1.

It can be seen from FIGS. 3, 4, 5, and 6 that the holograms 72*a*1, 72*b*1, 72*c*1, 72*a*2, 72*b*2 and 72*c*2 and the mirrors 74*a*1, 74*b*1, 74*c*1, 74*a*2, 74*b*2 and 74*c*2 make it possible to use practically all of the light delivered to the part of the frontlight unit 22' shown in FIG. 6 for illumination of the pixel 62' of the reflective display (not shown).

FIG. 7 is a top view of a part of the frontlight unit 22" (which is similar to the frontlight unit 22 in FIG. 1), which is shown in cooperation with an exemplary reflective display. Since this display is beyond the scope of the invention and is shown only as an example, it is depicted by broken lines. The matrix pattern of subpixels shown in FIG. 7 is the same as that shown in FIG. 6; however, to improve uniformity in illumination, the number of holograms and mirrors is increased so that each of the holograms 72*a*1', 72*b*1', 72*c*1', 72*a*1", 72*b*1", 72*c*1", etc., interact with two adjacent subpixels of the same light-distribution planar ridge waveguide 66*a*', 66*b*', 66*c*', 66*a*", 66*b*", 66*c*", etc. Reference numerals 74*a*1', 74*a*1", 74*b*1', 74*b*1", 74*c*1', 74*c*", etc., designate respective mirrors.

It can be seen from FIGS. 3, 4, 5, and 7 that the holograms and mirrors make it possible to use practically all of the light delivered to the part of the frontlight unit 22" shown in FIG. 7 to illuminate the pixel 62" of the reflective display (not shown).

Although the invention is shown and described with reference to specific embodiments, these embodiments should not be construed as limiting the areas of application of the invention and any changes and modifications are possible, provided that these changes and modifications do not depart from the scope of the attached patent claims. For example, the number of pixels and their patterns are shown in the drawings only as examples, and other patterns and quantities of subpixels can be used. Displays other than IMOD may be used in cooperation with the frontlight unit of the invention, and the IMOD is shown only as an example.

The invention claimed is:

1. A frontlight unit for interaction with a reflective display having pixels arranged in a matrix pattern, comprising:
    an optically transparent waveguide medium having an external surface;
    a core embedded in the optically transparent waveguide medium, the optically transparent waveguide medium functioning as a cladding for the core;
    a net of planar ridge waveguides formed by the core and the cladding;
    at least one source of laser light optically coupled with aforementioned net of planar ridge waveguides for delivery of laser light to the optically transparent waveguide medium, the net comprising light-separation means for separating laser light into individual lightbeams propagating in the planar ridge waveguides of the net and light-distribution means for receiving individual lightbeams and for distributing individual lightbeams to predetermined places of the net;

first individual lightbeam redirection means formed on the surface of the core in the aforementioned predetermined places of the net for redirecting individual lightbeams that propagate through the light-distribution means in the first direction to the planar ridge waveguide medium and in the second direction to the planar ridge waveguide medium; and second lightbeam redirection means located on the external surface of the optically transparent waveguide medium which receive beams emitted from the first individual lightbeam redirection means in the first direction and which redirect these beams in the second direction into the optically transparent waveguide medium and then into the reflective display with which the frontlight unit interacts, whereby all of the light delivered to the frontlight unit from at least one laser source of light is sent to the reflective display for enhancement of the image reproduced by the reflective display, wherein the light-separation means comprise first holograms, and the first individual lightbeam redirection means comprise the second holograms, said second holograms being arranged in a matrix pattern that coincides with the matrix pattern of the reflective display when the frontlight unit is interposed onto the reflective display.

2. The frontlight unit of claim 1, wherein the optically transparent waveguide medium further comprises an optically transparent substrate located on the side of the optically transparent waveguide medium that is opposite to the external surface.

3. A frontlight unit for interaction with a reflective display having pixels arranged in a matrix pattern, comprising:
an optically transparent waveguide medium having an external surface, a first direction and a second direction;
a core embedded in the optically transparent waveguide medium, the core comprising a net of planar ridge waveguides comprising a light-separating planar ridge waveguide that extends in the first direction of the optically transparent waveguide medium and a plurality of light-distribution planar ridge waveguides that extend in the second direction and are optically coupled with the light-separating planar ridge waveguide at predetermined areas of the latter;
at least three laser sources generating different wavelengths for delivery of light to the light-separating planar ridge waveguide;
first holograms formed in the light-separating planar ridge waveguide in said predetermined areas of the light-separating planar ridge waveguide for reorienting the light obtained from at least three laser sources of light to the light-distribution planar ridge waveguides;
second holograms formed in the light-distribution planar ridge waveguides that emit lightbeams of light obtained from the light-separating planar ridge waveguide in the upward direction and in the downward direction to the optically transparent waveguide medium and then to the reflective display with which the frontlight unit interacts, said second holograms being arranged in a matrix pattern that coincides with the matrix pattern of the reflective display when the frontlight unit is interposed onto the reflective display; and
lightbeam redirection means installed on the external surface of the optically transparent waveguide medium, the lightbeam redirection means receiving lightbeams emitted by the second holograms in the upward direction and being positioned on the external surface of the optically transparent waveguide medium in positions that provide reflection of the obtained lightbeams in the downward direction in the form of first diverging beams into the optically transparent waveguide medium and then into the reflective display with which the frontlight unit interacts, whereby all of the light delivered to the light-separating planar ridge waveguide from the laser sources of light is sent to the reflective display for enhancement of the image reproduced by the reflective display.

4. The frontlight unit of claim 3, wherein at least three laser sources generating different wavelengths comprise red, green, and blue lasers, respectively.

5. The frontlight unit of claim 4, wherein the lightbeam redirection means installed on the external surface of the optically transparent waveguide medium comprise reflective mirrors.

6. The frontlight unit of claim 4, wherein the optically transparent waveguide medium comprises an optically transparent substrate part and a cladding part formed on the optically transparent substrate part, the core being embedded into the cladding part and the cladding part having an outer surface that forms said outer surface of the optically transparent waveguide medium.

7. The frontlight unit of claim 5, wherein the optically transparent waveguide medium comprises an optically transparent substrate part and a cladding part formed on the optically transparent substrate part, the core being embedded into the cladding part and the cladding part having an outer surface that forms said outer surface of the optically transparent waveguide medium.

8. The frontlight unit of claim 3, wherein the first holograms comprise holograms of at least three types, wherein a hologram of each type interacts with the light of a wavelength different from the wavelengths specified for the holograms of other types.

9. The frontlight unit of claim 8, wherein the first holograms interact with the lights of at least red, green, and blue colors.

10. The frontlight unit of claim 3, wherein the light-distribution planar ridge waveguides of at least red, green, and blue colors are combined into the light-distribution planar ridge waveguide sets.

11. The frontlight unit of claim 10, wherein the light-distribution planar ridge waveguide sets are uniformly distributed in the optically transparent waveguide medium.

12. The frontlight unit of claim 3, wherein the second holograms are located on the light-distribution planar ridge waveguide at specified areas.

13. The frontlight unit of claim 9, wherein the second holograms are located on the light-distribution planar ridge waveguide at specified areas.

14. The frontlight unit of claim 11, wherein the second holograms are located on the light-distribution planar ridge waveguide at specified areas.

15. The frontlight unit of claim 3, wherein lightbeams reflected by the second holograms in the upward direction are focused in front of the lightbeam redirection means and fall onto the lightbeam redirection means in the form of second diverging beams that do not exceed the boundaries of the respective lightbeam redirection means, while lightbeams emitted by the second holograms in the downward direction to the optically transparent waveguide medium and then to the reflective display are focused in said optically transparent waveguide medium and form third diverging beams that fall onto the reflective display and are located within the boundaries of said first diverging beams.

16. The frontlight unit of claim 3, wherein at least three laser sources generating different wavelengths comprise red, green, and blue lasers, respectively.

17. The frontlight unit of claim 16, wherein the lightbeam redirection means installed on the external surface of the optically transparent waveguide medium comprises reflective mirrors.

18. The frontlight unit of claim 15, wherein the optically transparent waveguide medium comprises an optically transparent substrate part and a cladding part formed on the optically transparent substrate part, the core being embedded into the cladding part and the cladding part having an outer surface that forms said outer surface of the optically transparent waveguide medium.

19. The frontlight unit of claim 17, wherein the optically transparent waveguide medium comprises an optically transparent substrate part and a cladding part formed on the optically transparent substrate part, the core being embedded into the cladding part and the cladding part having an outer surface that forms said outer surface of the optically transparent waveguide medium.

20. The frontlight unit of claim 3, wherein the first holograms comprise holograms of at least three types, wherein a hologram of each type interacts with the light of a wavelength different from the wavelengths specified for holograms of other types.

* * * * *